(12) United States Patent
Moser

(10) Patent No.: US 9,152,184 B2
(45) Date of Patent: Oct. 6, 2015

(54) HYBRID COMPUTER

(71) Applicant: George Moser, Redwood City, CA (US)

(72) Inventor: George Moser, Redwood City, CA (US)

(*) Notice: Subject to any disclaimer, the term of this patent is extended or adjusted under 35 U.S.C. 154(b) by 184 days.

(21) Appl. No.: 14/061,718

(22) Filed: Oct. 23, 2013

(65) Prior Publication Data

US 2014/0139990 A1 May 22, 2014

Related U.S. Application Data

(60) Provisional application No. 61/726,752, filed on Nov. 15, 2012.

(51) Int. Cl.
*G06F 1/16* (2006.01)
(52) U.S. Cl.
CPC ............ *G06F 1/1681* (2013.01); *G06F 1/1616* (2013.01); *G06F 1/1654* (2013.01)
(58) Field of Classification Search
CPC .................................. G06F 1/16; G06F 1/1616
USPC .................................................... 361/679.55
See application file for complete search history.

(56) References Cited

U.S. PATENT DOCUMENTS

| | | | |
|---|---|---|---|
| 8,995,117 B1* | 3/2015 | Hayashida et al. | 361/679.27 |
| 2012/0081270 A1* | 4/2012 | Gimpl et al. | 345/1.3 |
| 2014/0118929 A1* | 5/2014 | Leung et al. | 361/679.55 |
| 2014/0293534 A1* | 10/2014 | Siddiqui | 361/679.55 |
| 2014/0340843 A1* | 11/2014 | Huang et al. | 361/679.55 |
| 2014/0376179 A1* | 12/2014 | Jenkins et al. | 361/679.55 |

* cited by examiner

*Primary Examiner* — Forrest M Phillips
(74) *Attorney, Agent, or Firm* — Brad Bertoglio

(57) ABSTRACT

A hybrid computer system is provided. The hybrid computer includes a display portion attached to a base portion via hinge. The display portion can be folded flat against the base portion such that the display screen faces outwards, for use in a tablet computer configuration. The display portion can alternatively be tilted upwards relative to the base portion, with the display portion being hinged at a front edge of the display and in a middle section of the base portion. When the display is articulated upwards, a support structure can be deployed between the backside of the display and the base portion, in order to provide physical support to the display and resistance against hinge movement in response to a user pressing on the display to engage touchscreen functionality.

6 Claims, 18 Drawing Sheets

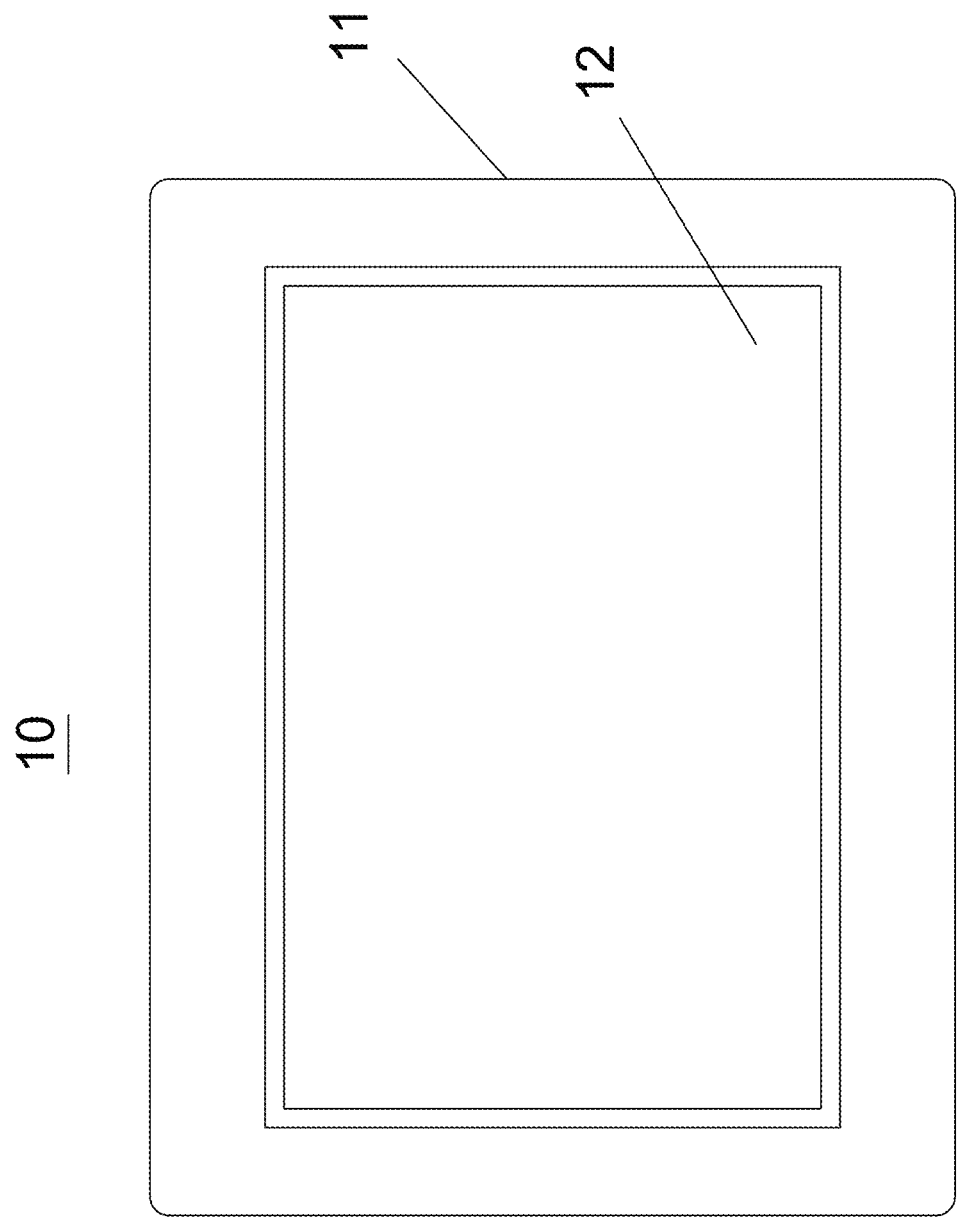

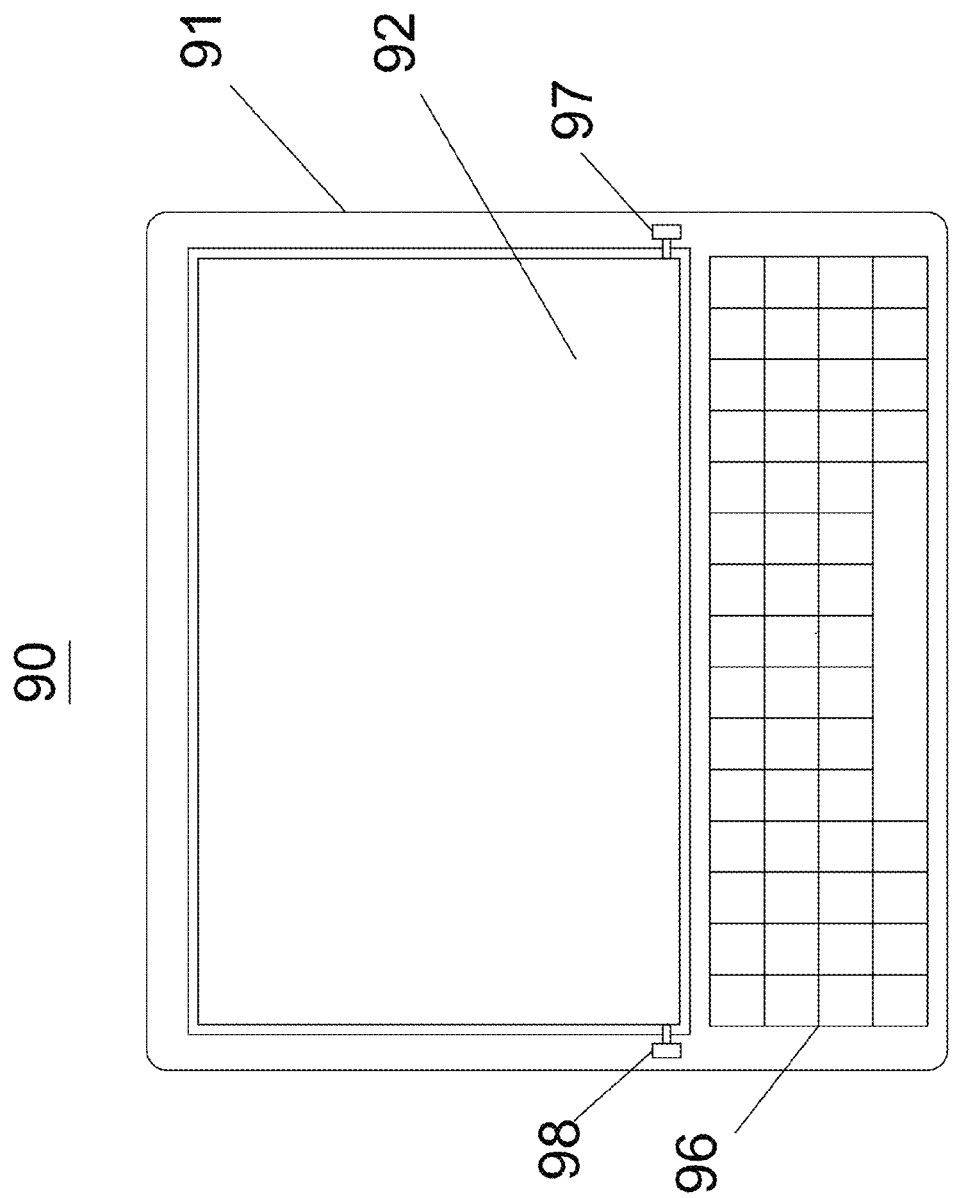

HYBRID COMPUTER

BACKGROUND OF THE INVENTION

The present invention relates in general to the computer field, and in particular, to a new category of portable computer that combines the advantages of a laptop computer and a tablet.

Tablet computers have grown in popularity because of their portability and ease of touchscreen input. However, some shortcomings and obstacles remain which limit the practical application of a tablet to only some applications such as checking email or playing simple games. More elaborate applications still require a real computer, such as a laptop computer. There are several reasons for that limitation, such as a) the lack of a keyboard for faster, more reliable and more convenient input than a touchscreen, b) generally tablets are underpowered for real computer work which usually requires more storage capacity, more memory, more peripheral devices, faster processors, more battery capacity and generally more computer resources than current tablets normally provide.

As shown in FIG. 1, a typical prior art tablet computer 10 includes a computer housing 11 and a touchscreen 12 which is used for visual output as well as for user input. Inside the housing 11 and underneath the touchscreen panel 12 there are the internal components of the tablet computer (not shown in FIG. 1), such as the motherboard, the data storage device, the battery and others.

FIG. 2 shows a cross-section of the tablet computer.

FIG. 2A shows a typical state of the art laptop computer with a base 212 and a display 213. This type of computers typically provides enough power for real computer work, but until now they generally lack the user-friendliness of a laptop computer. Some attempts have been made to equip this type of laptops with a touchscreen to provide tablet-like user-friendliness, but some obstacles have been encountered which have prevented the adoption by the users. One of those obstacles has been the fact that when a laptop as the one in FIG. 2A is equipped with a touchscreen as part of its display unit 213, said display unit tends to move and oscillate when the user touches the touchscreen to enter some input, which is uncomfortable because the image is moving and vibrating in front of the user. Even with a stronger and tighter hinge it is difficult to avoid this problem because of the distance between the hinge and the points of touch. A moving, slightly oscillating display can make a user dizzy or frustrated, making touchscreen usage impractical for such type of computer.

BRIEF DESCRIPTION OF THE DRAWINGS

FIG. 1 is a top plan view of a prior art tablet computer.

FIG. 2 is a cutaway side view of the prior art tablet computer.

FIG. 9 is a top plan view of a hybrid computer according to another embodiment.

DETAILED DESCRIPTION

The hybrid computer of the illustrated embodiments may provide the convenience and user-friendliness of a tablet combined with the more powerful resources and capabilities of a conventional laptop computer.

Figure 2A:
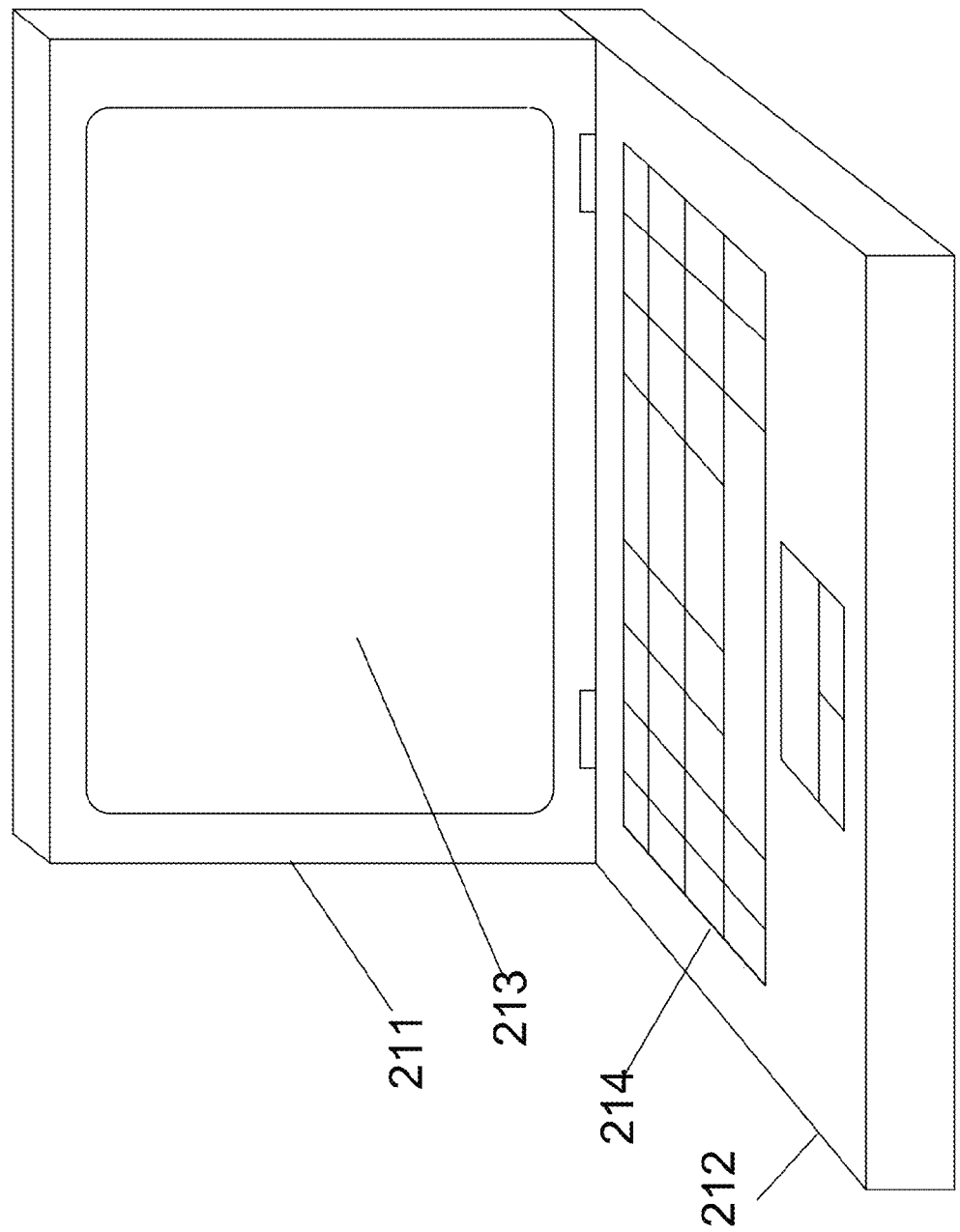
FIG. 2A is a perspective view of a prior art laptop computer.
Figure 3:
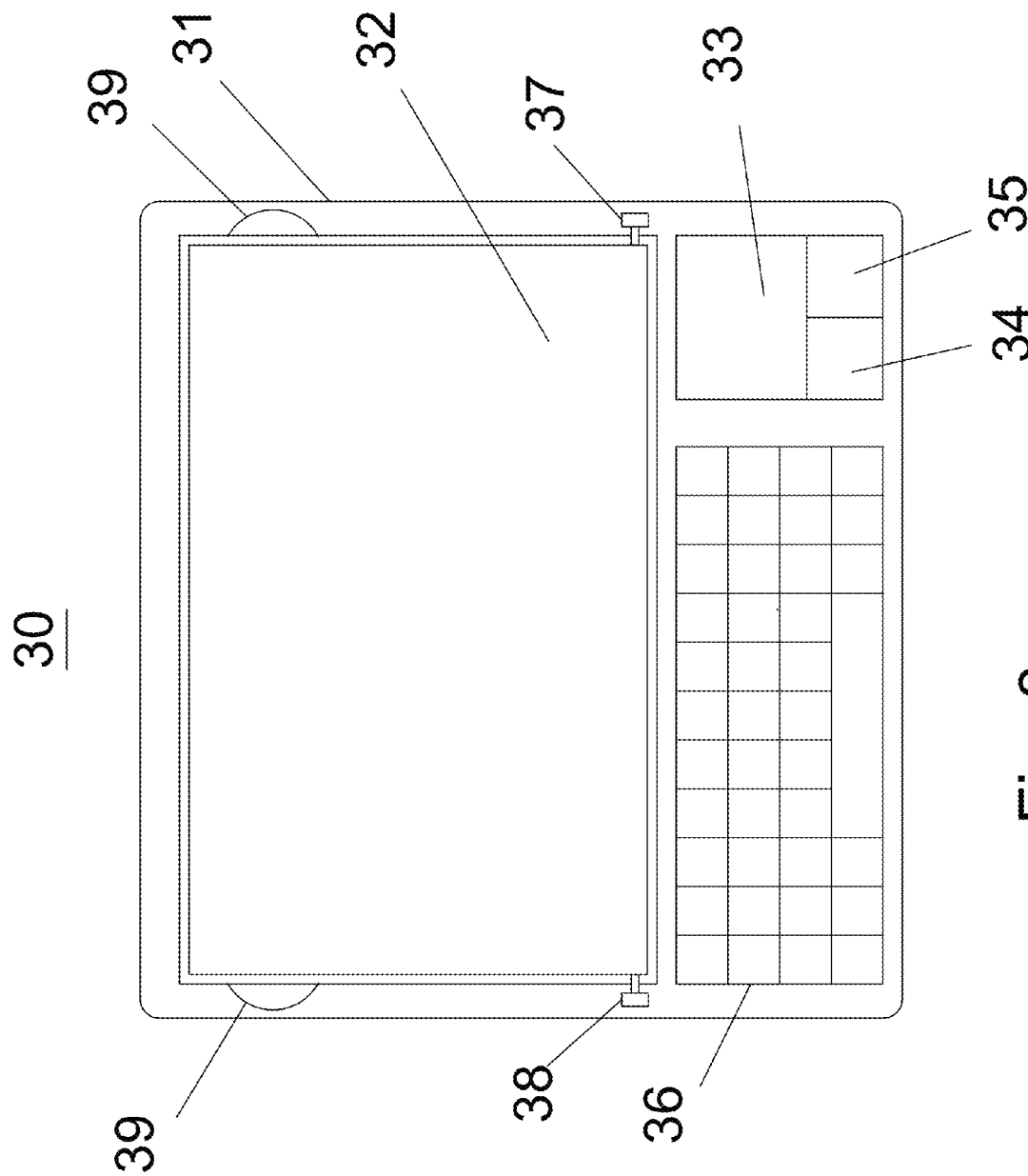
FIG. 3 is a top plan view of a hybrid computer, according to a first embodiment.

FIG. 3 shows a top view of one embodiment of the invention. The hybrid computer can also be referred to as the Laplet (laptop-tablet computer), a term that describes this new category of computer and which the inventor uses as the trademark for this product. The hybrid computer 30 consists of a housing 31, which contains the display screen 32, a keyboard 36, a touchpad 33 and buttons 34 and 35. The cavities 39 are intended to facilitate the lifting of the display by the user by inserting his fingertips into said cavities. The display screen 32 is preferably equipped with a touchscreen to enable the computer to function both as a laptop computer and as a tablet. Another possible embodiment of this invention could omit the touchpad 33, which is not essential, since the display provides touch sensing capability that can be used in lieu of a touchpad. Another possible embodiment could omit the touchscreen in order to provide a laptop-only configuration at lower cost. Another possible embodiment could include a touchscreen in a laptop-only configuration with touch capability, in order to use a touch-oriented operating system such as Window 8 in a full-fledged laptop computer that is not intended to operate also as a tablet. Therefore concepts described herein apply not only to hybrid computers, but also to laptops and tablets.

Figure 4:
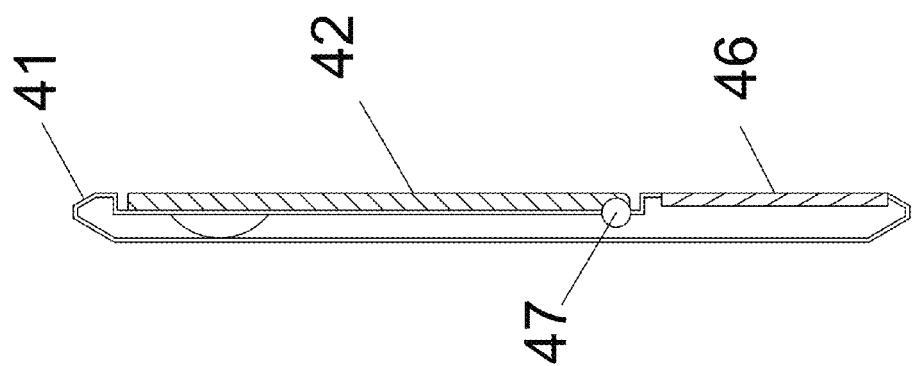
FIG. 4 is a cross-section of the embodiment of FIG. 3.

FIG. 4 shows a cross-section of the hybrid computer of this invention. The basic components shown include the housing 41, the display screen 42 and the keyboard 46. The internal components such as the motherboard, the batter, the optical drive and other devices (not shown in FIG. 4) are located inside the housing 41 and underneath the display screen 42 and the keyboard 46.

As can be seen in FIG. 4, the display screen 42 is rotatably attached to the housing 41 through hinges 47. The display screen 42 is typically a touchscreen, and can be based on any the prior art touchscreen technologies such as capacitive, resistive, SAW, IPS or others. The display itself is typically a liquid crystal display (LCD), but it can also be an OLED display, a digital ink display or any other type of visual display.

Figure 5:
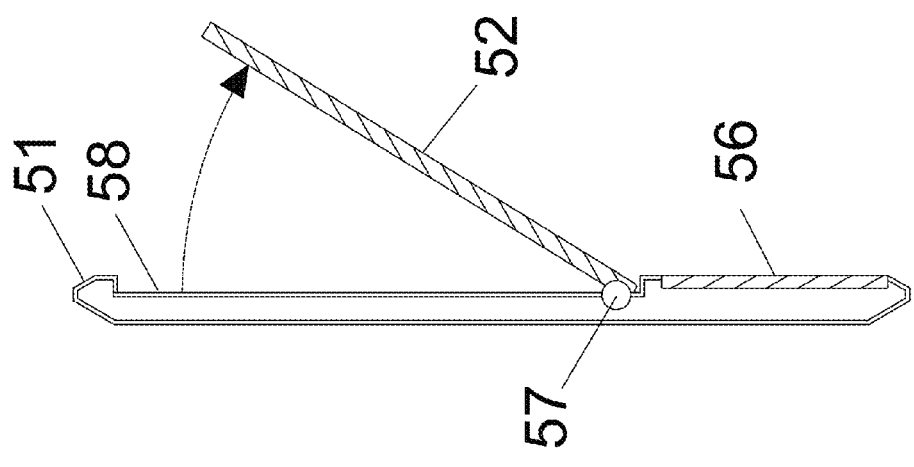
FIG. 5 is a cross-section of the embodiment of FIG. 3, with the display articulated into an angled position.

FIG. 5 shows that the user can lift the display screen 52 to a desired optimal viewing angle by causing the display screen 52 to rotate about the hinges 57. The deployment of the display screen can be achieved in a manual or automated way. An automated deployment can be achieved using a small electric motor, a solenoid mechanism, a spring release mechanism or other methods where the user can press a button, switch or other release mechanism to cause the display to rotate into position. The stowing of the screen back into its bay 58 can also be manual or automated.

Figure 6:
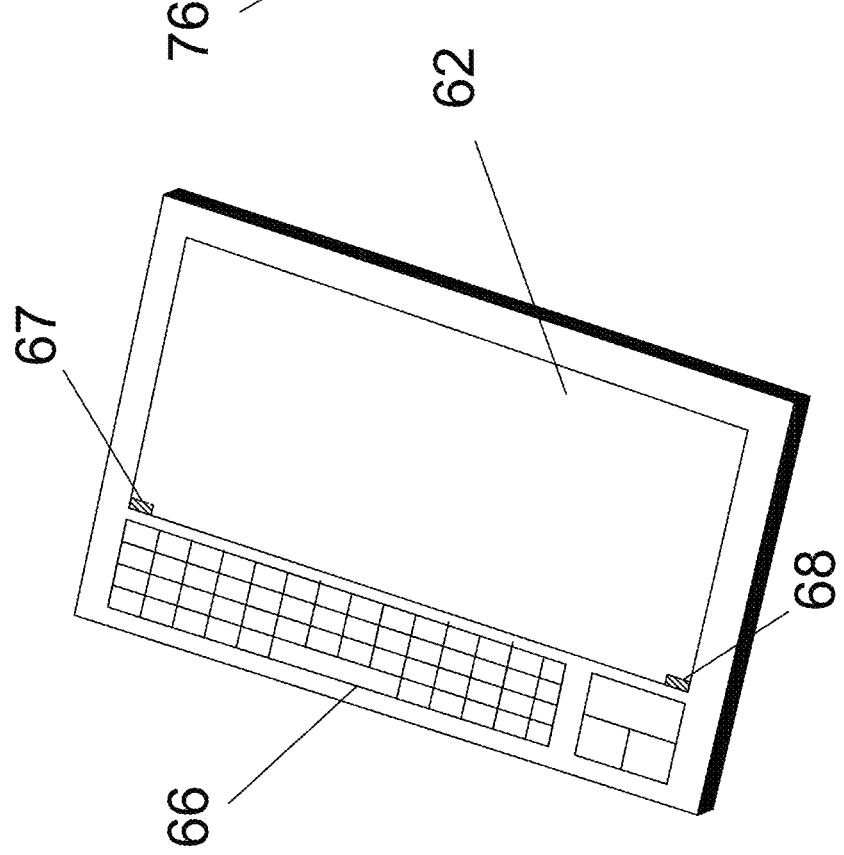
FIG. 6 is perspective view of the embodiment of FIG. 3 in portrait orientation.

FIG. 6 shows that the user can use the hybrid computer in tablet mode by holding it in his/her arm like a typical tablet while using the other hand for input through the touchscreen 62. In tablet mode the screen has been folded down on the base by rotating down about the hinges 67 and 68. In FIG. 6 the user is using the hybrid computer in tablet mode and in portrait orientation.

Figure 7:
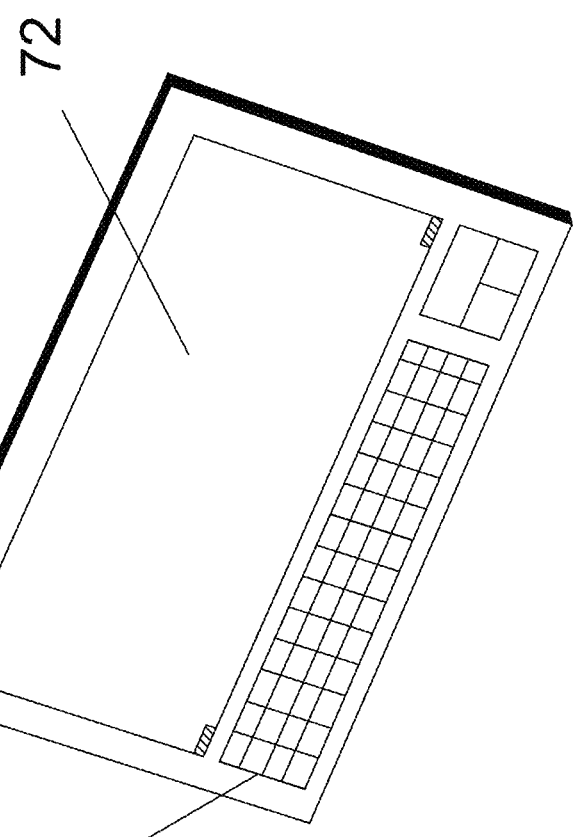
FIG. 7 is a perspective view of the embodiment of FIG. 3 in a landscape orientation.

In FIG. 7 the user is using the hybrid computer in tablet mode and in landscape orientation. This orientation has the advantage that the user can use the keyboard 76 for input, in addition to the touchscreen 72.

Figure 8:
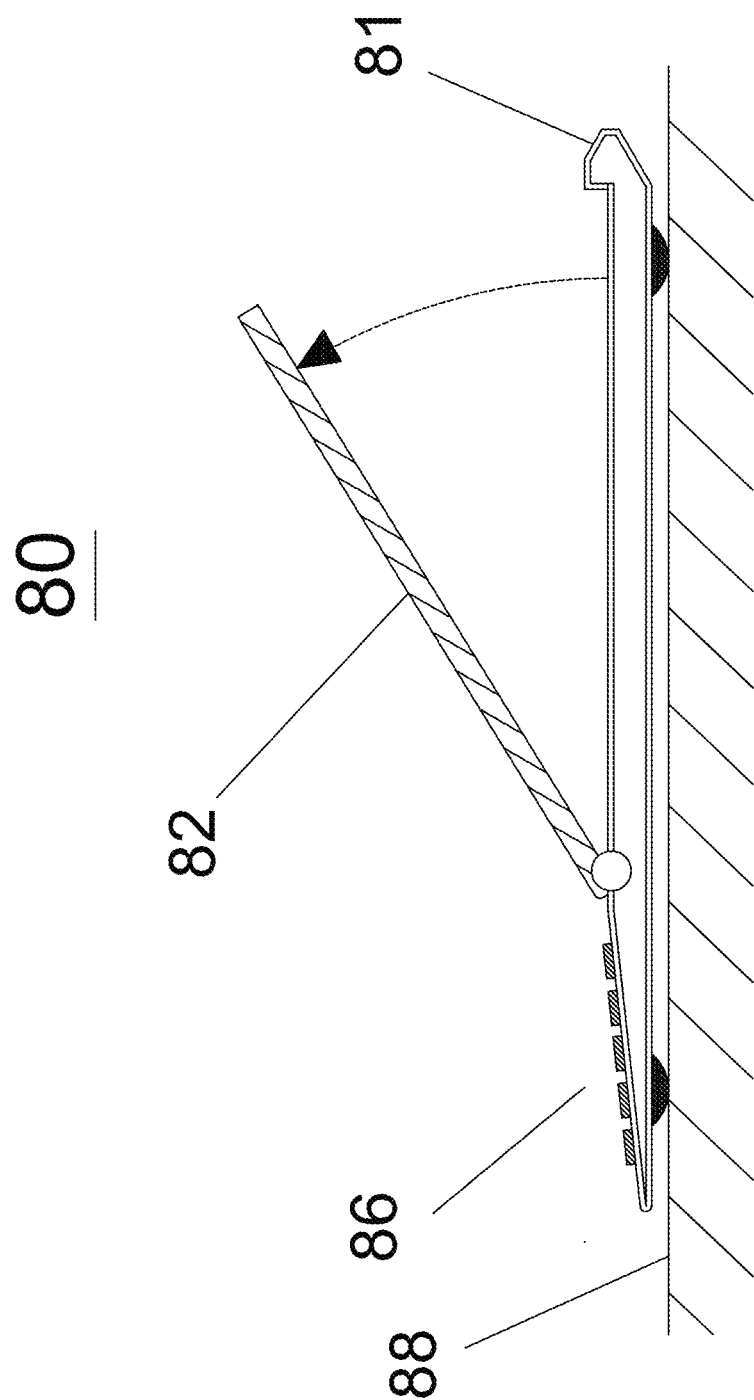
FIG. 8 is a side view cross-section of a hybrid computer with articulated display.

FIG. 8 shows a cross-section of hybrid computer 80 being used in laptop mode, i.e. with the computer housing 81 resting on a surface 88. The surface 88 can be the lap of the user or the surface of a desk or table. In this mode the hybrid computer can be used like a regular full-fledged laptop computer for jobs of any level of complexity (not just for very simple applications like a tablet).

Figure 8A:
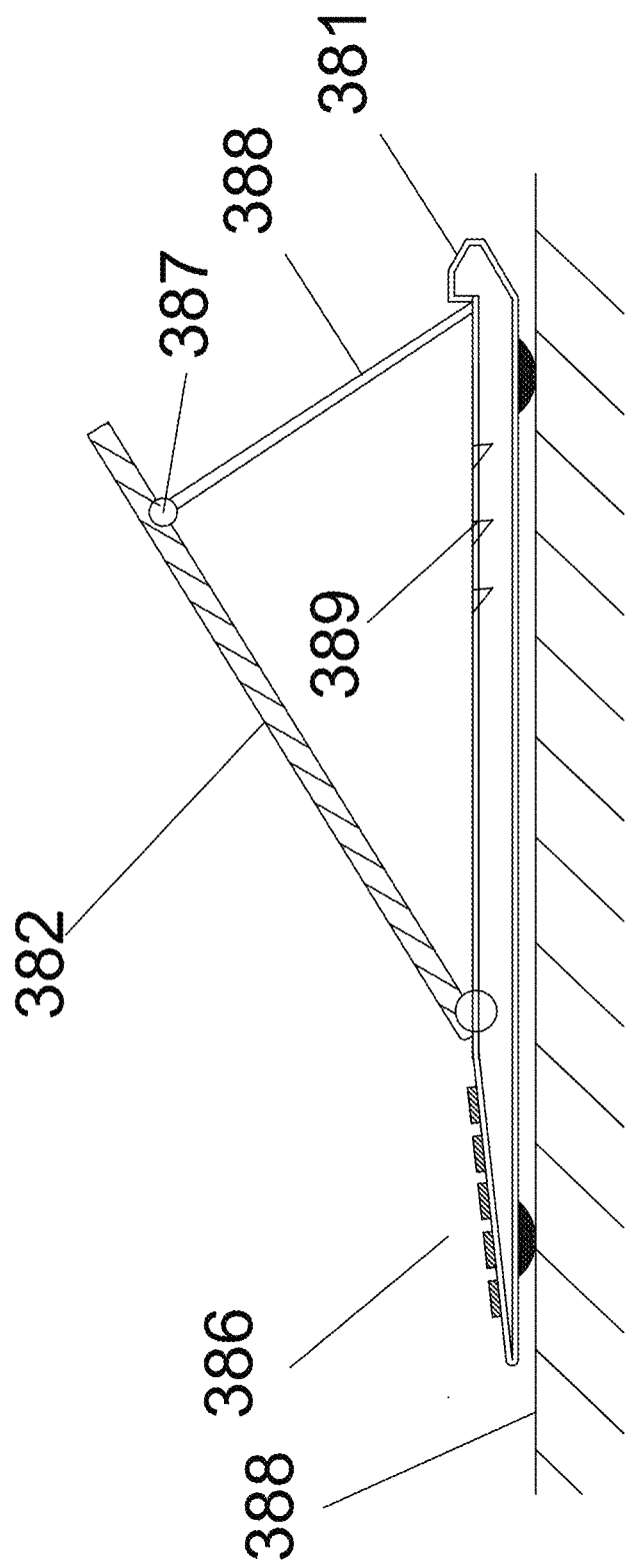
FIG. 8A is a side view cross-section of a hybrid computer with articulated display and display support member.

FIG. 8A illustrates another embodiment. The embodiment of FIG. 8A includes features which may address oscillation issues arising during use of computing device with touchscreen, particularly with a hinged display such as typical laptop computers. The display 382 is equipped with a support 388, which pivots around the pivot 387 and rests on the base 381 to firmly support the display 382. Support 388 can act to prevent movement and oscillation when a user touches the touchscreen display 382. As illustrated, support 388 rests against a rear edge of base 381 in order to support and stabilize display 382. Optionally, base 381 may include indentations or grooves 389 or similar features which physically engage with support 388 in one or more alternative positions to restrain support 388 from movement in response to the application of pressure to touchscreen 382. While the embodiment of FIG. 8A provides grooves 389 to restrain movement of support 388 and prevent support 388 from sliding along the length of base 381, it is expressly contemplated and understood that alternative means of restricting the movement of support 388 relative to base unit 381 could readily be implemented. For example, magnets can be provided under the surface of the base 381 or inside the support 388, which interact with other magnets or ferromagnetic counterparts to maintain the support at a selected one of one or more positions. Furthermore, in embodiment illustrated in FIG. 8A, support 388 is rotatably attached to display 382 via hinge structure 387; however, it is understood that in other embodiments, support 388 can be articulated at a pivot point on the base 381 (instead of the display 382), in which case the support may engage with grooves, slots, magnets or other movement-constraining structures within the display.

An additional advantage of certain embodiments described herein is that because of the display support, it may be possible to use simple non-frictional hinges for articulation of the display relative to the base, which are not only less expensive, but also much smaller and lighter, and enable further size and weight reduction in laptops, tablets and hybrid computers, which are typically important design criteria for these devices.

FIG. 9 shows a variation of the previously described embodiment of the invention wherein the touch pad and the touch buttons have been eliminated. The touch pad and the touch buttons (previously identified as items 32 through 35 in FIG. 3). The touchpad and the buttons are not essential since the touchscreen 92 can provide that functionality. Eliminating them creates more space at the bottom of the base for a large, comfortable keyboard 96. It also reduces cost of course, without reducing functionality.

Figure 10:
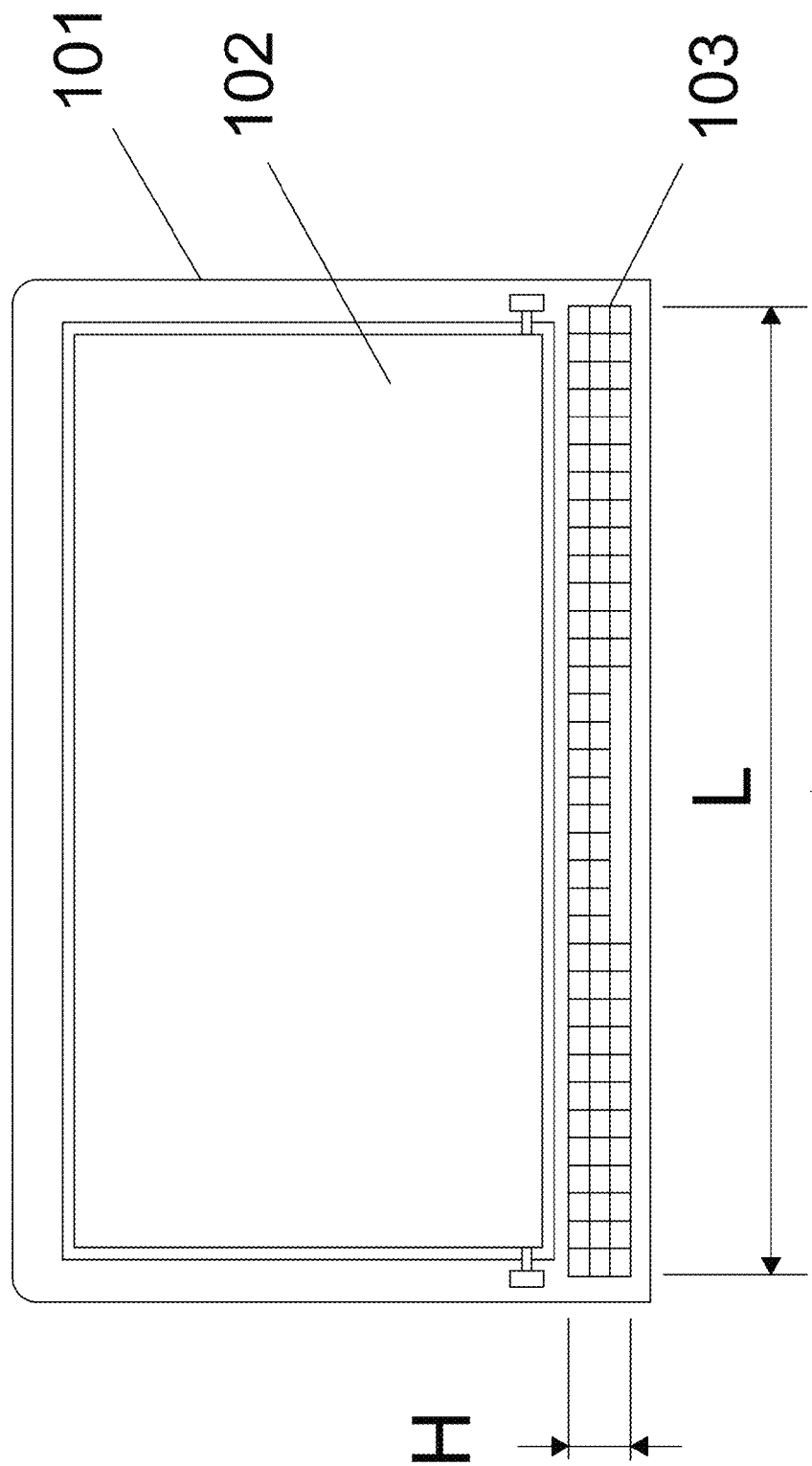
FIG. 10 is a top plan view of a hybrid computer embodiment having a compact keyboard.

FIG. 10 shows another embodiment of the invention wherein the keyboard 103 has been streamlined to provide a reduced height H, which makes it possible to use a larger screen 102. There are several ways to reduce the keyboard height H, such as reducing the number of rows and increasing the length L, or using re-assignable keys with a smart keyboard. A smart keyboard can be achieved for instance based on each key having a miniature display, possibly with e-ink technology, so that the keys can display a different label depending on user choice or context.

Figure 11:
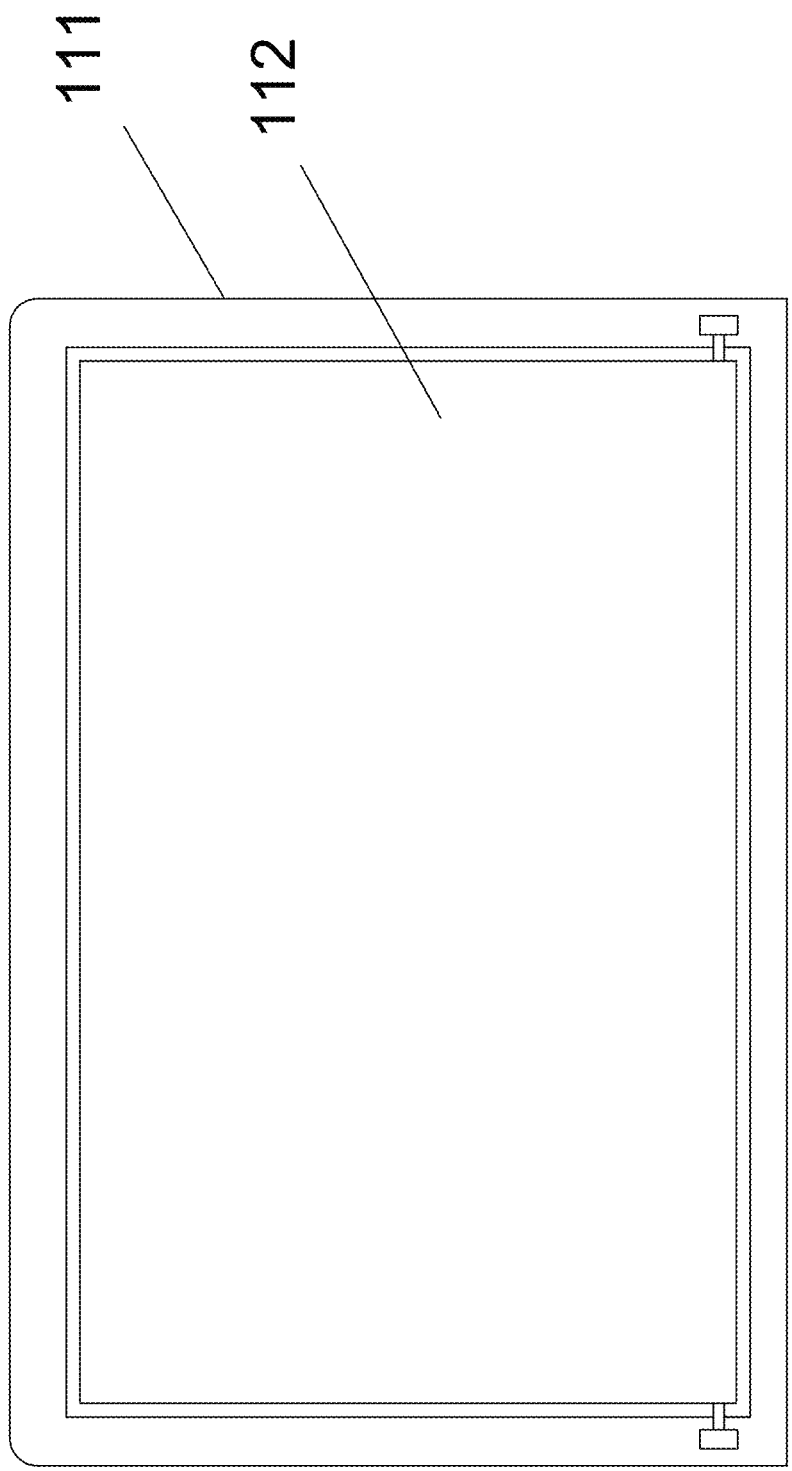
FIG. 11 is a top plan view of a hybrid computer embodiment without keyboard.

FIG. 11 shows another embodiment of the invention without a keyboard. All input has to rely on the touchscreen 112. The advantage of this embodiment with respect to a conventional tablet is that it can be used like any regular tablet at any time but it can also be resting on the surface of a desk or table. Optionally this embodiment can also have a support as previously shown in FIGS. 8A and 8B.

Figure 12:
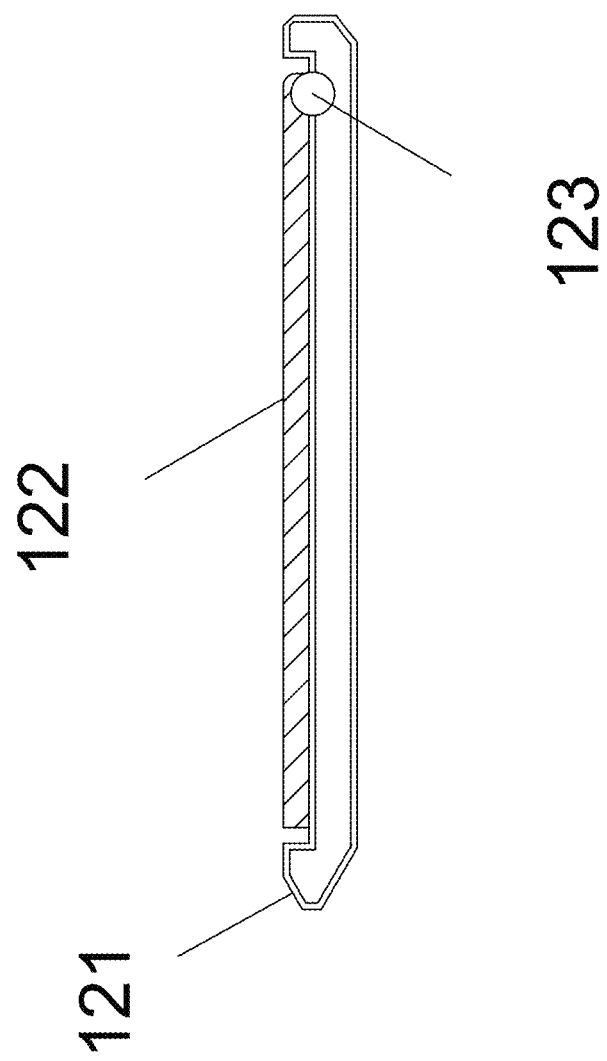
FIG. 12 is a side view cross section of the embodiment of FIG. 11.

FIG. 12 shows a cross-section of FIG. 11.

Figure 13:
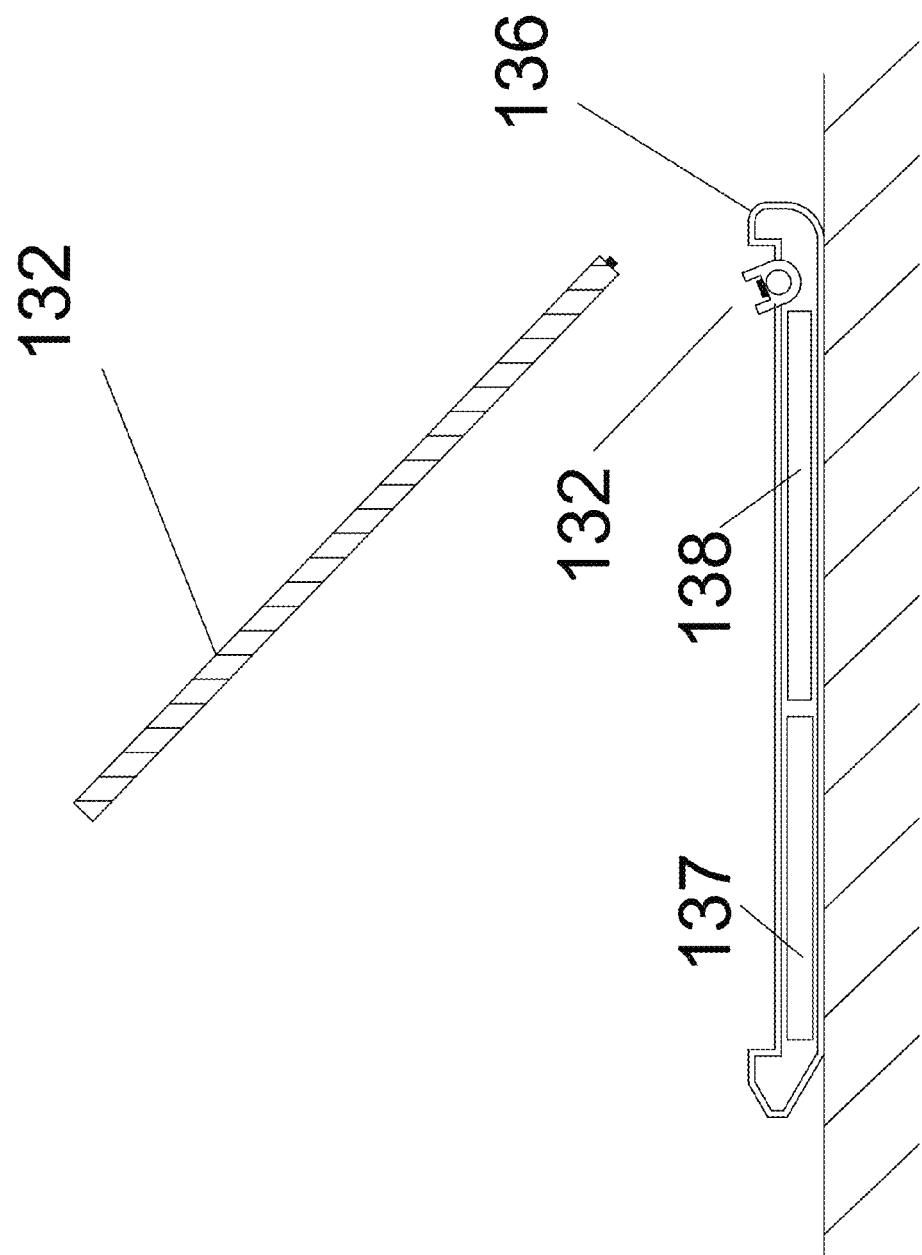
FIG. 13 is a side view cross section of a further embodiment having a display unit that is separable from a base unit.

FIG. 13 shows that the display 132 can be made as a separable tablet, which can operate independently with its own motherboard, battery and other internal devices. The display/tablet 132 can be plugged into the pivoting connector 132, which connects the display/tablet 132 to the housing 136 both mechanically and electrically. The housing 136 can contain an additional battery 137, additional storage (hard disk or solid state disk) 138 and other components not shown in FIG. 13A, such as an optical drive, additional memory, a second motherboard, communications hardware and software and other components that can expand the basic functionality of the tablet to allow it to function n as a real computer when the tablet/display 132 is plugged into the housing 136.

Figure 14:
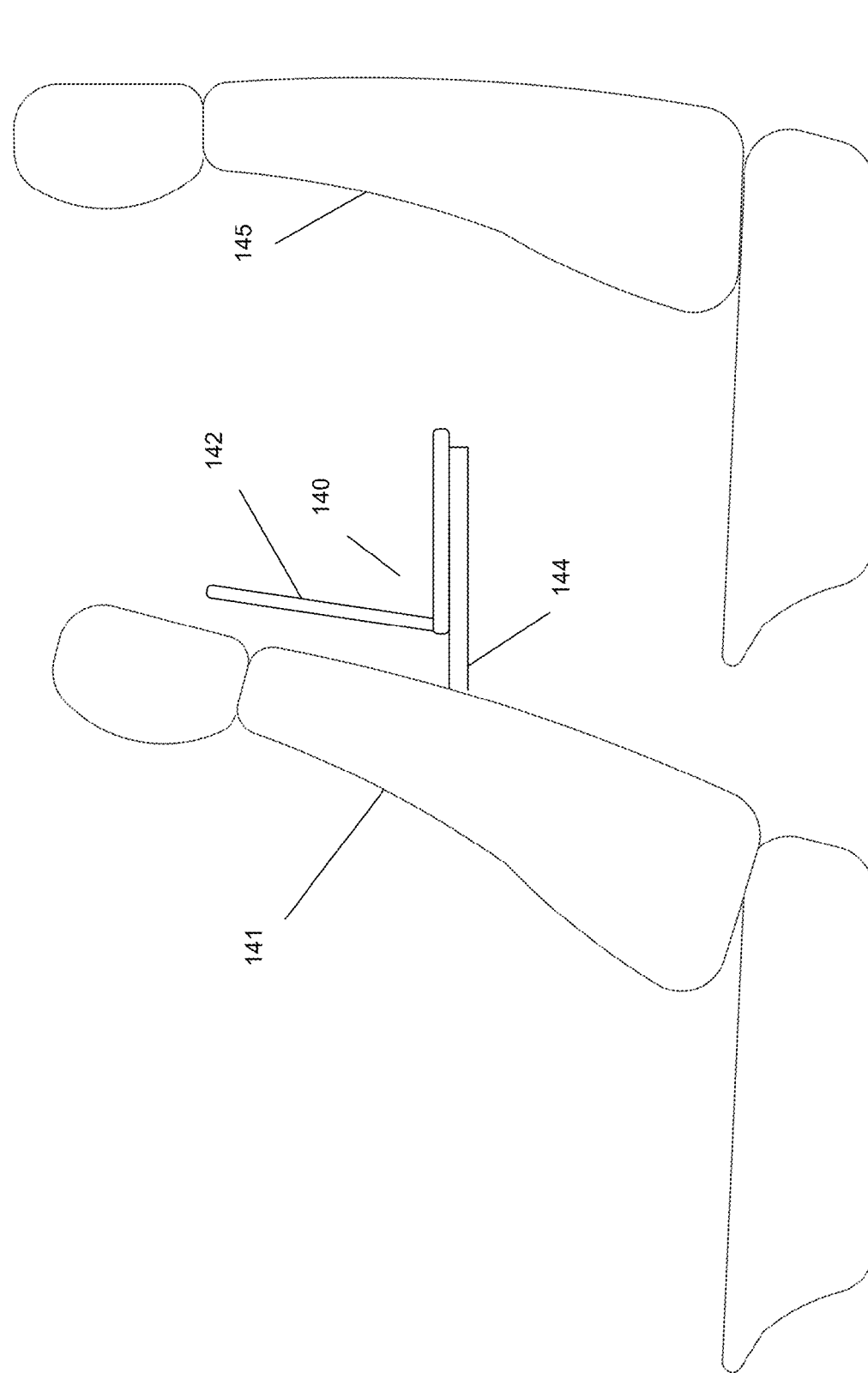
FIG. 14 is a side view of a prior art laptop computer in a space-constrained environment.
Figure 15:
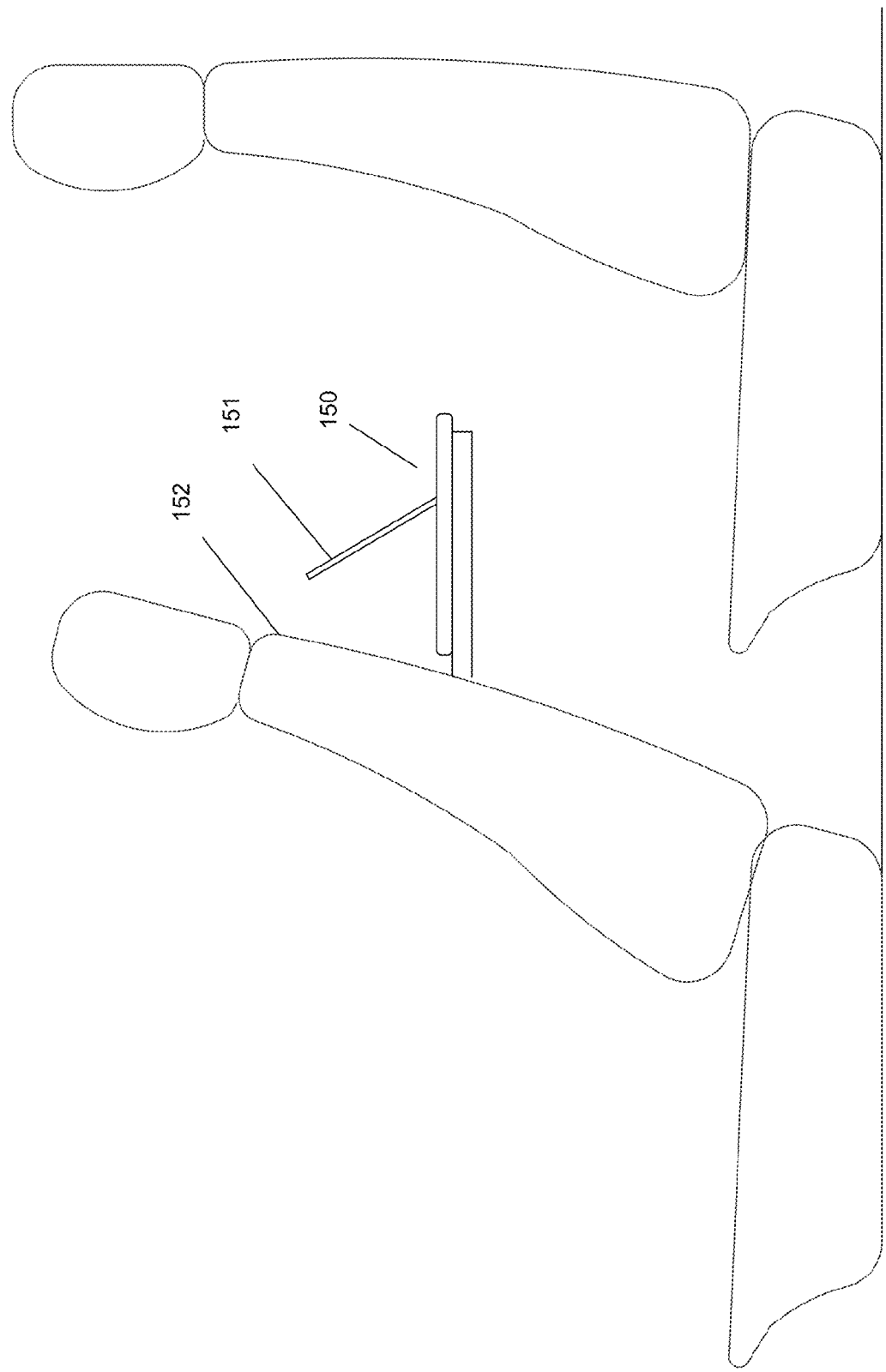
FIG. 15 is a side view of a hybrid computer in accordance with embodiments described herein, in the space-constrained environment.

FIGS. 14 and 15 illustrate some of the advantage of the computer of this invention in an airplane seat. FIG. 14 shows how a conventional laptop computer 140 may be difficult to open and adequately locate on an airplane table 144, because the screen 142 clashes with the back of the reclined seat 141. Therefore the user may not be able to achieve the right viewing angle for the screen. By contrast, FIG. 15 shows how the hybrid computer 150 of this invention is easy to open, even in a tight airplane seat, because the hinge is closer to the user and therefore screen 151 does not clash with the back of the front seat 152 and can be easily oriented at an optimum viewing angle.

Figure 16:
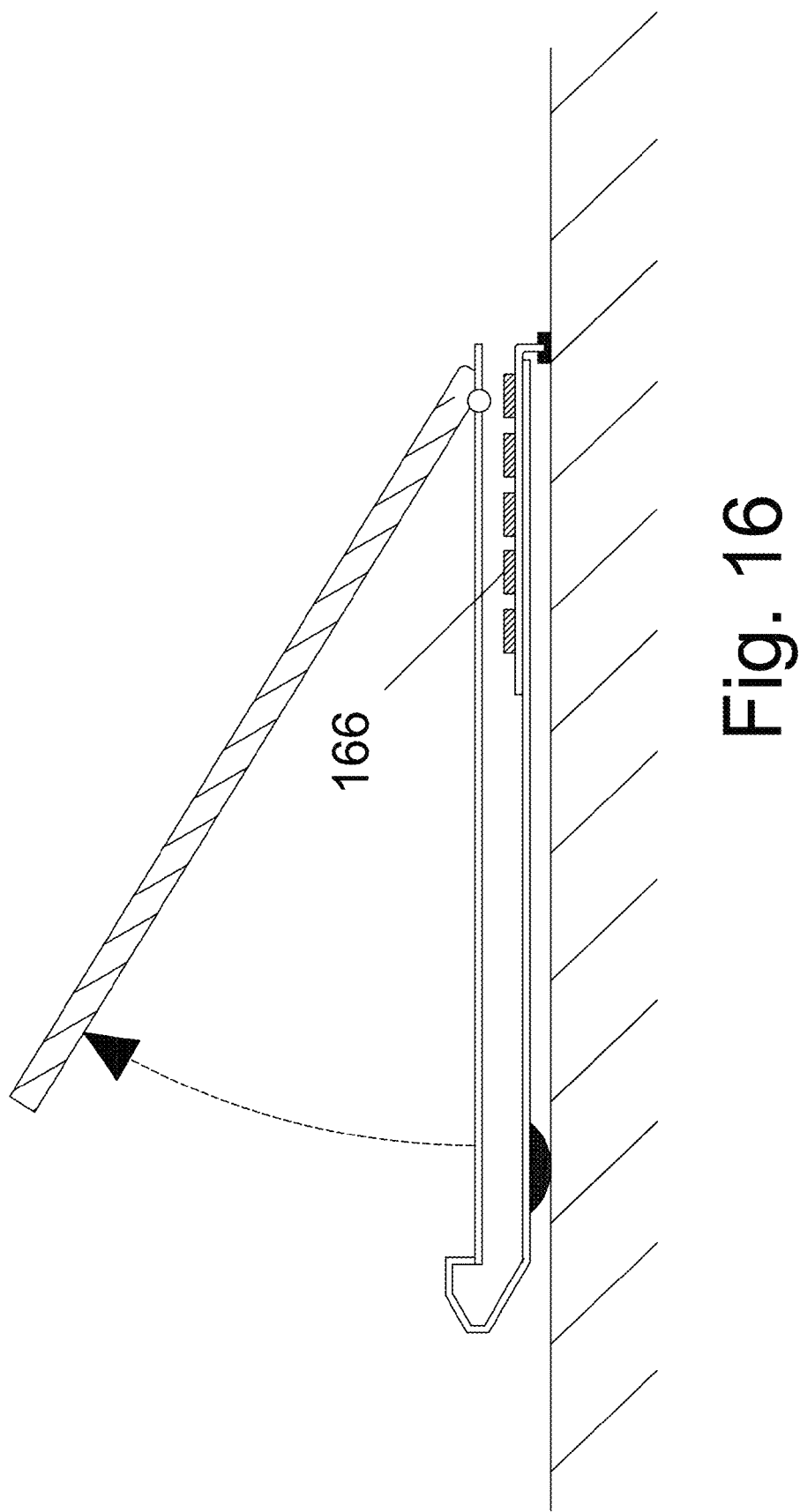
FIG. 16 is a side view cross section of a further embodiment of a hybrid computer having a deployable keyboard in a stowed position.
Figure 17:
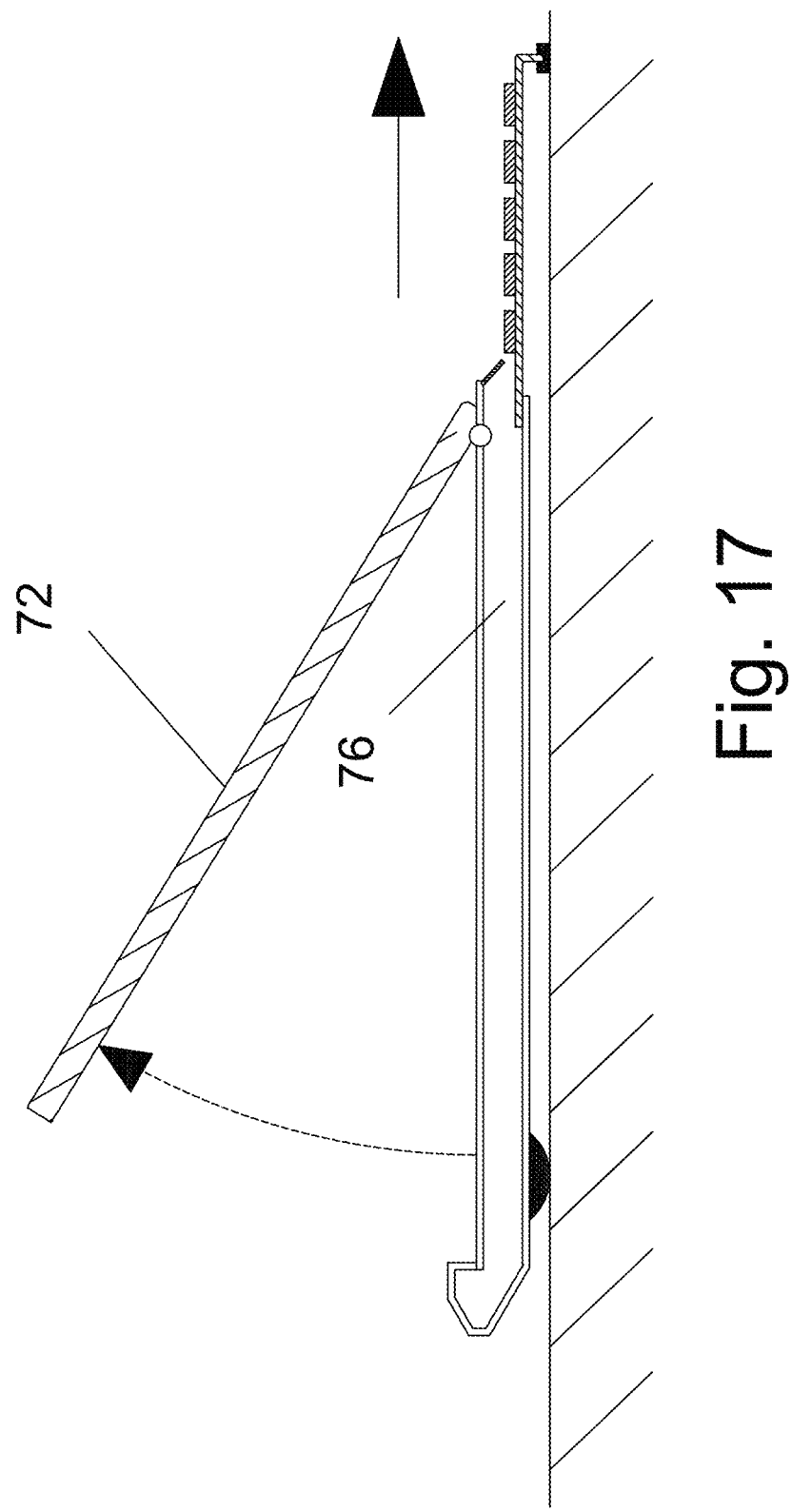
FIG. 17 is a side view cross section of the embodiment of FIG. 16, with the keyboard in a deployed position.

FIG. 16 shows that the hybrid computer can be equipped with a deployable keyboard 166 (similar to a deployable CD-ROM drive). In FIG. 16 the deployable keyboard is shown in stowed position. FIG. 17 shows the keyboard in deployed position.

Figure 18:
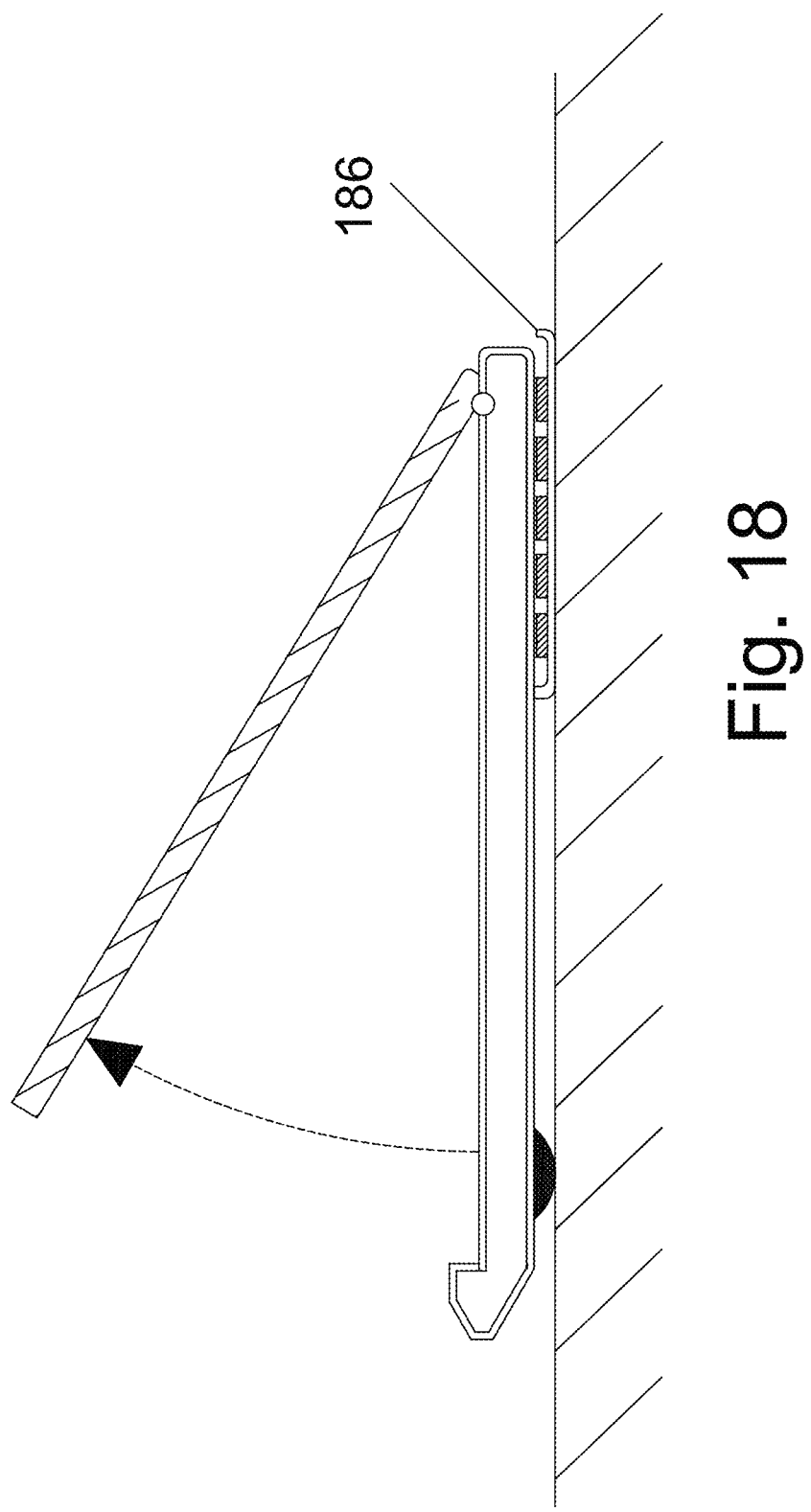
FIG. 18 is a side view cross section of another embodiment of a hybrid computer having a deployable keyboard in a stowed position.
Figure 19:
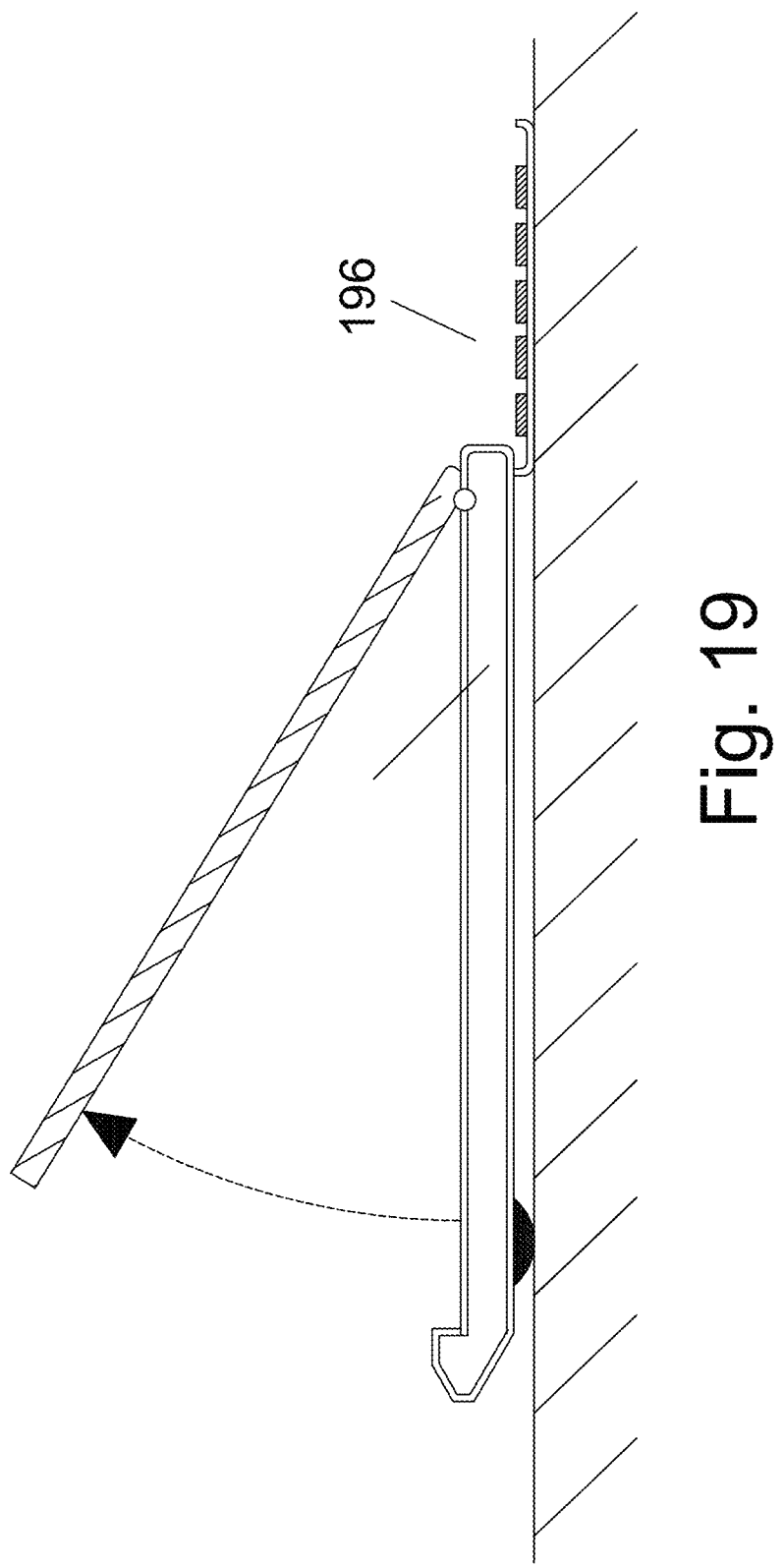
FIG. 19 is a side view cross section of the embodiment of FIG. 18, with the keyboard in a deployed position.

FIG. 18 shows a keyboard 186 attached to the bottom of the hybrid computer. FIG. 19 shows the keyboard 196 in deployed position.

The above disclosures and descriptions are not intended to limit the scope of the invention. A person skilled in the art can modify the above described embodiments while still remaining within the scope of the invention.

What is claimed:

1. A computer system comprising: a housing containing the computer components, wherein said housing has a front side that is near the user and a back side which is farther away from the user;
   - a keyboard for data input which is located near the front side of the housing;
      - a hinged touchscreen display that is approximately co-planar with the keyboard, with the keyboard exposed to the user, when the display is in a stowed position, and which display can be deployed at an angle with respect to the user for convenient viewing of the display; and
   - a set of at least one hinge that allows the display to be deployed by rotating it about an axis located closer to the front side of the housing than to the back side of the housing.

2. The computer system of claim 1 wherein the deployed display is supported by a support structure comprising at least one bracket, leg, plate, tab or other supporting element, in order to provide rigidity and prevent the display from moving and oscillating when touched by the user to operate the touchscreen.

3. The computer system of claim 2 wherein the support structure is normally attached to the display or to the computer base.

4. The computer system of claim 2 wherein the support structure is position-adjustable through grooves, slots, or indentations on the base or on the display.

5. The computer system of claim 2 wherein the support structure is position-adjustable through coupling of magnets or ferromagnetic elements on the base with magnets or ferromagnetic elements on the display.

6. The computer system of claim 1 wherein the computer does not utilize friction or other torque-based hinges to support the display but instead relies on non-torque hinges or low-torque hinges and a back support to support the display.

* * * * *